(12) United States Patent
Park et al.

(10) Patent No.: US 9,527,502 B1
(45) Date of Patent: Dec. 27, 2016

(54) METHOD AND APPARATUS FOR CONTROLLING PLUG-IN HYBRID ELECTRIC VEHICLE

(71) Applicants: Hyundai Motor Company, Seoul (KR); Kia Motors Corporation, Seoul (KR)

(72) Inventors: Joonyoung Park, Seoul (KR); Sungdeok Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/920,934

(22) Filed: Oct. 23, 2015

(30) Foreign Application Priority Data

Jun. 4, 2015 (KR) .......................... 10-2015-0079293

(51) Int. Cl.
*B60W 20/10* (2016.01)
*B60W 20/00* (2016.01)
(Continued)

(52) U.S. Cl.
CPC .............. *B60W 20/10* (2013.01); *B60W 10/06* (2013.01); *B60W 10/08* (2013.01); *B60W 20/12* (2016.01); *B60W 2510/244* (2013.01); *B60W 2540/00* (2013.01); *B60W 2550/142* (2013.01); *B60W 2710/06* (2013.01); *B60W 2710/08* (2013.01); *B60Y 2200/92* (2013.01)

(58) Field of Classification Search
CPC ...... B60W 20/10; B60W 20/12; B60W 10/06; B60W 10/08; B60W 2510/244; B60W 2540/00; B60W 2550/142; B60W 2710/06; B60W 2710/08; B60Y 2200/92

USPC ......................................................... 701/22
See application file for complete search history.

(56) References Cited

U.S. PATENT DOCUMENTS

2009/0277701 A1 11/2009 Soma et al.
2011/0035147 A1 2/2011 Kimishima
(Continued)

FOREIGN PATENT DOCUMENTS

EP 1975028 A2 10/2008
JP 2007-307995 A 11/2007
(Continued)

OTHER PUBLICATIONS

Extended European Search Report for European Patent Application No. 15191961.0, dated Oct. 28, 2016, 10 pages.

*Primary Examiner* — McDieunel Marc
*Assistant Examiner* — James E Stroud
(74) *Attorney, Agent, or Firm* — Mintz Levin Cohn Ferris Glovsky and Popeo, P.C.; Peter F. Corless

(57) ABSTRACT

A method and apparatus for operating a plug-in hybrid electric vehicle are provided. The includes setting an initial distance until charge (DUC) and calculating a current DUC by subtracting a travel distance of the vehicle from the initial DUC after the initial DUC is set. A current distance to empty (DTE) is calculated based on a current state of charge (SOC) of a battery and the current SOC of the battery is compared with a reference SOC. The current DUC is compared with the current DTE when the current SOC is greater than the reference SOC. Thus, whether a high speed condition or a high load condition is satisfied is determined when the current DUC is greater than the current DTE. A driving mode of the vehicle is then set to be a charge sustaining (CS) mode when the high speed condition or the high load condition is satisfied.

20 Claims, 7 Drawing Sheets

(51) Int. Cl.
*B60W 10/06* (2006.01)
*B60W 10/08* (2006.01)

(56) References Cited

U.S. PATENT DOCUMENTS

| | | | |
|---|---|---|---|
| 2011/0172867 A1* | 7/2011 | Yu | B60K 6/445 701/22 |
| 2012/0035795 A1 | 2/2012 | Yu et al. | |
| 2012/0158209 A1 | 6/2012 | Doy et al. | |
| 2012/0290159 A1* | 11/2012 | McGee | B60K 6/445 701/22 |
| 2013/0009595 A1* | 1/2013 | Brown | F28D 15/0266 320/108 |
| 2013/0218379 A1* | 8/2013 | Filev | G01C 21/3617 701/22 |
| 2014/0163789 A1* | 6/2014 | Yu | B60W 10/06 701/22 |
| 2016/0063772 A1* | 3/2016 | Esler | G07C 5/004 701/123 |
| 2016/0082857 A1* | 3/2016 | Naghshtabrizi | G01R 31/3648 701/22 |
| 2016/0129797 A1* | 5/2016 | Jackson | B60L 11/1816 320/109 |

FOREIGN PATENT DOCUMENTS

| | | |
|---|---|---|
| JP | 2010-179749 A | 8/2010 |
| JP | 2010-280250 A | 12/2010 |
| JP | 2011-016473 A | 1/2011 |
| JP | 2011-057116 A | 3/2011 |
| JP | 2013-095246 A | 5/2013 |
| KR | 10-0867795 | 11/2008 |
| KR | 10-1180801 | 9/2012 |

* cited by examiner

METHOD AND APPARATUS FOR CONTROLLING PLUG-IN HYBRID ELECTRIC VEHICLE

CROSS-REFERENCE TO RELATED APPLICATION

This application claims priority to and the benefit of Korean Patent Application No. 10-2015-0079293 filed in the Korean Intellectual Property Office on Jun. 4, 2015, the entire contents of which are incorporated herein by reference.

BACKGROUND (a) Field of the Invention

The present invention relates to a plug-in hybrid electric vehicle, and more particularly, to a method and an apparatus for controlling a plug-in hybrid electric vehicle.

(b) Description of the Related Art

As is generally known in the art, a hybrid electric vehicle (HEV) uses an internal combustion engine and a battery power supply together to drive the vehicle. In other words, the hybrid electric vehicle uses power of the internal combustion engine and power of the motor which are efficiently combined to drive the vehicle. Recently, a plug-in hybrid electric vehicle (PHEV) has been researched in which a battery chargeable by an external power supply is mounted.

FIGS. 5, 6A, and 6B are exemplary graphs for describing a driving mode of a conventional plug-in hybrid electric vehicle according to the related art. As illustrated in FIGS. 5 and 6A-6B, the driving mode of the plug-in hybrid electric vehicle may include a charge depleting (CD) mode and a charge sustaining (CS) mode.

When the battery is charged by the external power supply, the driving mode of the plug-in hybrid electric vehicle is established as the CD mode and the plug-in hybrid electric vehicle is driven by electrical energy of the battery until a state of charge (SOC) of the battery reaches to a reference SOC. In particular, an engine may start when a demand power of a driver is greater than a predetermined power. When the SOC of the battery becomes the reference SOC, the driving mode of the plug-in hybrid electric vehicle is set to be the CS mode. Particularly, the plug-in hybrid electric vehicle is driven so that the SOC of the battery corresponds to a target SOC.

When the SOC of the battery is maintained to be greater than the reference SOC and the battery may again be charged by the external power supply, the setting of the CD mode is advantageous in energy efficiency independent of the traveling condition. However, when the battery is again charged by the external power supply when the SOC of the battery is equal to or less than the reference SOC, even though the SOC of the battery is greater than the reference SOC, the setting of the CD mode is not suitable in the energy efficiency under the specific traveling condition (e.g., expressway, uphill road, etc.).

The above information disclosed in this section is merely for enhancement of understanding of the background of the invention and therefore it may contain information that does not form the prior art that is already known in this country to a person of ordinary skill in the art.

SUMMARY

The present invention provides a method and an apparatus for controlling a plug-in hybrid electric vehicle having advantages of setting a driving mode of a plug-in hybrid electric vehicle to be suitable for a current traveling condition.

A method for controlling a plug-in hybrid electric vehicle according to an exemplary embodiment of the present invention may include: setting an initial distance until charge (DUC) (e.g., distance until a charge of the battery is required); calculating a current DUC by subtracting a travel distance of the plug-in hybrid electric vehicle from the initial DUC after the initial DUC is set; calculating a current distance to empty (DTE) based on a current state of charge (SOC) of a battery; comparing the current SOC of the battery with a reference SOC; comparing the current DUC with the current DTE when the current SOC is greater than the reference SOC; determining whether a high speed condition or a high load condition is satisfied when the current DUC is greater than the current DTE; and setting a driving mode of the plug-in hybrid electric vehicle to be a charge sustaining (CS) mode when the high speed condition or the high load condition is satisfied.

The setting of the initial DUC may include: determining whether the battery is charged by an external power supply; displaying a message window that requests an input of the initial DUC through a user interface unit when the battery is charged by the external power supply; and receiving information regarding the initial DUC from the user interface unit. In addition, the setting of the initial DUC may include: receiving information regarding a designation through the user interface unit; and setting a distance from a current position of the plug-in hybrid electric vehicle to the designation to be the initial DUC.

The method may further include setting the driving mode of the plug-in hybrid electric vehicle to be a CS mode when the current SOC of the battery is less than or equal to the reference SOC. Additionally, the method may include setting the driving mode of the plug-in hybrid electric vehicle to be a charge depleting (CD) mode when the current DUC is less than or equal to the current DTE. A driving mode of the plug-in hybrid electric vehicle may be to be a charge depleting (CD) mode when the high speed condition or the high load condition is not satisfied.

Whether the high speed condition or the high load condition is satisfied may be determined based on a moving average value of a vehicle speed and a moving average value of a gradient of a road. The moving average value $MAV_k$ of the vehicle speed may be calculated from the following equation:

$$MAV_k = \sum_{i=1}^{n} (V_{k-n+i} \times WV_i),$$

wherein, $V_{k-n+i}$ is a vehicle speed at timing k−n+1 and $WV_i$ is an i-th weight value. The n weight values may satisfy relation of $WV_i \leq WV_{i+1}$.

The moving average value $MAS_k$ of the gradient of the road may be calculated from the following equation:

$$MAS_k = \sum_{i=1}^{m} (S_{k-m+i} \times WS_i),$$

wherein $S_{k-m+i}$ is a gradient of a road at timing k−m+1 and $WS_i$ is an i-th weight value. The m weight values may satisfy relation of $WS_i \leq WS_{i+1}$.

The method may further include: comparing demand power of a driver with a first predetermined power when the driving mode of the plug-in hybrid electric vehicle is set to be the CS mode; and starting an engine when the demand power of the driver is greater than the first predetermined power. In addition, the method may include: comparing the demand power of the driver with a second predetermined power when the driving mode of the plug-in hybrid electric vehicle is set to be a charge deleting (CD) mode; and starting the engine when the demand power of the driver is greater than the second predetermined power, wherein the first predetermined power is less than the second predetermined power.

An apparatus for controlling a plug-in hybrid electric vehicle according to an exemplary embodiment of the present invention may include: a data detector configured to detect data used to operate the plug-in hybrid electric vehicle; a user interface unit configured to provide an interface that receives user input; and a controller configured to be executed by a predetermined program to operate the plug-in hybrid electric vehicle based on signals input from the data detector and the user interface unit.

As described above, according to an exemplary embodiment of the present invention, it may be possible to set the driving mode of plug-in hybrid electric vehicle suitable for the current traveling condition. As a result, it may be possible to improve the energy efficiency of the plug-in hybrid electric vehicle.

BRIEF DESCRIPTION OF THE DRAWINGS

The drawings are for reference in describing an exemplary embodiment of the present invention, so that it shall not be construed that the technical spirit of the present invention is limited to the accompanying drawings.

DESCRIPTION OF SYMBOLS

Figure 1:
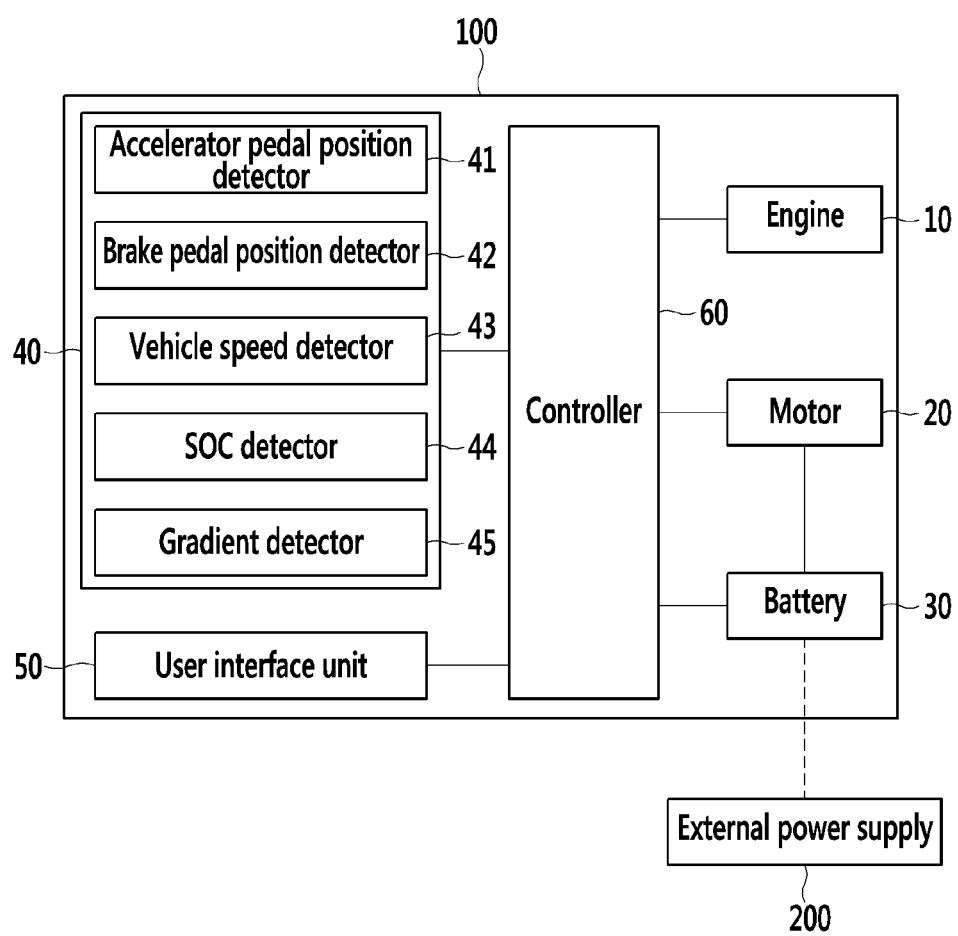
FIG. 1 is a diagram of a plug-in hybrid electric vehicle according to an exemplary embodiment of the present invention.

10: Engine
20: Motor
30: Battery
40: Data detector
50: User interface unit
60: Controller
100: Plug-in hybrid electric vehicle
200: External power supply

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully hereinafter with reference to the accompanying drawings, in which exemplary embodiments of the invention are shown. However, the present invention is not limited to the exemplary embodiments set forth herein but may be modified in many different forms. In addition, since the respective components shown in the accompanying drawings are arbitrarily shown for convenience of explanation, the present invention is not necessarily limited to contents shown in the accompanying drawings.

FIG. 1 is a diagram of a plug-in hybrid electric vehicle according to an exemplary embodiment of the present invention. As illustrated in FIG. 1, a plug-in hybrid electric vehicle 100 according to an exemplary embodiment of the present invention may include an engine 10, a motor 20, a battery 30, a data detector 40, a user interface unit 50, and a controller 60.

The engine 10 may be configured to combust a fuel to generate power, and various engines such as a gasoline engine, a diesel engine, and an LPI engine may be used as the engine 10. In connection with torque transmission of the plug-in hybrid electric vehicle 100, torque generated from the engine 10 and/or the motor 20 may be selectively transmitted to an input shaft of a transmission, and torque output from an output shaft of the transmission may be transmitted to an axle via a differential gear apparatus. The axle may be configured to rotate a wheel to allow the torque generated from the engine 10 and/or the motor 20 to drive the plug-in hybrid electric vehicle 100. The battery 30 may be configured to supply electricity to the motor 20 and may be charged by an external power supply 200. Further, the battery 30 may be charged by braking and inertial energy recovered through electrical power generation of the motor 20 during braking of the vehicle or during driving the vehicle by inertia (i.e., regenerative braking mode).

Further, the data detector 40 may be configured to detect data used to operate the plug-in hybrid electric vehicle 100, and the data detected by the data detector 40 may be transmitted to the controller 60. The data detector 40 may include an accelerator pedal position sensor 41, a brake pedal position sensor 42, a vehicle speed sensor 43, an SOC sensor 44, and a gradient sensor 45. The accelerator pedal position sensor 41 may be configured to detect a position value of an accelerator pedal (e.g., an engagement degree or the amount of pressured exerted onto the accelerator pedal) and transmit a signal corresponding thereto to the controller 60. When the accelerator pedal is completely engaged, the position value of the accelerator pedal may be about 100%, and when the accelerator pedal is disengaged (e.g., no pressure is exerted onto the accelerator pedal), the position value of the accelerator pedal may be about 0%.

Additionally, the brake pedal position detector 42 may be configured to detect a position value of a brake pedal (e.g., an engagement degree or the amount of pressure exerted onto the brake pedal) and transmit a signal corresponding thereto to the controller 60. When the brake pedal is completely engaged, the position value of the brake pedal may be about 100%, and when the brake pedal is disengaged (e.g. no pressure is exerted onto the brake pedal), the position value of the brake pedal may be about 0%.

The vehicle speed sensor 43 may be configured to detect a vehicle speed and transmit a signal corresponding thereto to the controller 60. The SOC sensor 44 may be configured to detect a state of charge (SOC) of the battery 30 and transmit a signal corresponding thereto to the controller 60. Instead of directly detecting the SOC of the battery 30, a current and a voltage of the battery 30 may be measured, and the SOC of the battery 30 may be calculated from the measured current and voltage.

The gradient sensor 45 may be configured to detect gradient of a road on which the plug-in hybrid electric vehicle 100 is currently positioned (e.g., road on which the vehicle is being driven) and transmit a signal corresponding thereto to the controller 60. The user interface unit 50 may be configured to provide an interface for user (e.g., driver) selection (e.g., to an interface configured to receive user input) and transmit signals input based on a user manipulation to the controller 60. Particularly, a navigation apparatus may be used as the user interface unit 50. The navigation apparatus may include an input and output unit for inputting and outputting information regarding route guidance, a current position detector configured to detect information regarding a current position of the plug-in hybrid electric vehicle 100, a memory in which map data required for route calculation and data required for guidance may be stored, an interface controller configured to perform a route search or a route guidance, and the like.

The controller 60 may be implemented with one or more microprocessors executed by a predetermined program. The predetermined program may include a series of commands for performing each step included in a method for operating a plug-in hybrid electric vehicle 100 according to an exemplary embodiment of the present invention to be described below. In particular, the controller 60 may be configured to set a driving mode of the plug-in hybrid electric vehicle 100 to be a charge sustaining (CS) mode or a charge depleting (CD) mode based on the signals input from the data detector 40 and the user interface unit 50. The controller 60 may be configured to calculate a demand power of the driver based on the accelerator pedal position value and the vehicle speed and determine whether to start the engine 10 based on the demand power of the driver.

Figure 2:
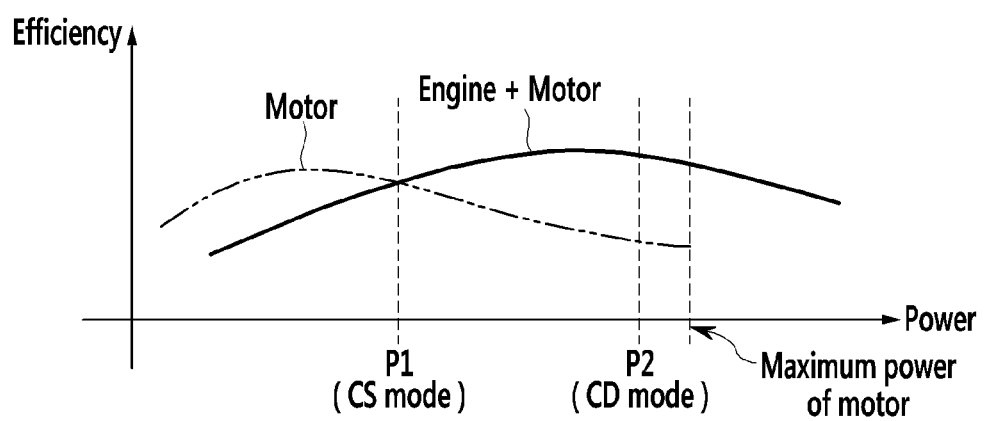
FIG. 2 is a graph illustrating a starting of an engine of the plug-in hybrid electric vehicle according to an exemplary embodiment of the present invention.

FIG. 2 is a graph illustrating a starting of an engine of the plug-in hybrid electric vehicle 100 according to an exemplary embodiment of the present invention. Referring to FIG. 2, when the driving mode of the plug-in hybrid electric vehicle 100 is set to be the CS mode and the demand power of the driver is greater than a first preset power P1, the controller 60 may be configured to start the engine 10. In other words, when the energy efficiency at the time of using the engine 10 and the motor 20 is greater than that at the time of using the motor 20, the controller 60 may be configured to start the engine 10.

When the driving mode of the plug-in hybrid electric vehicle 100 is set to be the CD mode and the demand power of the driver is greater than a second preset power P2, the controller 60 may be configured to start the engine 10. In other words, even though the energy efficiency while using the engine 10 and the motor 20 is greater than that when using the motor 20, when the demand power of the driver is equal to or less than the second preset power P2, the controller 60 may be configured to use the electrical energy of the battery 30 charged by the external power supply 200 to drive the plug-in hybrid electric vehicle 100. The second preset power P2 may be set in consideration of the maximum power which may be output by the motor 20, wherein the maximum power may be previously determined by experiment.

Figure 3:
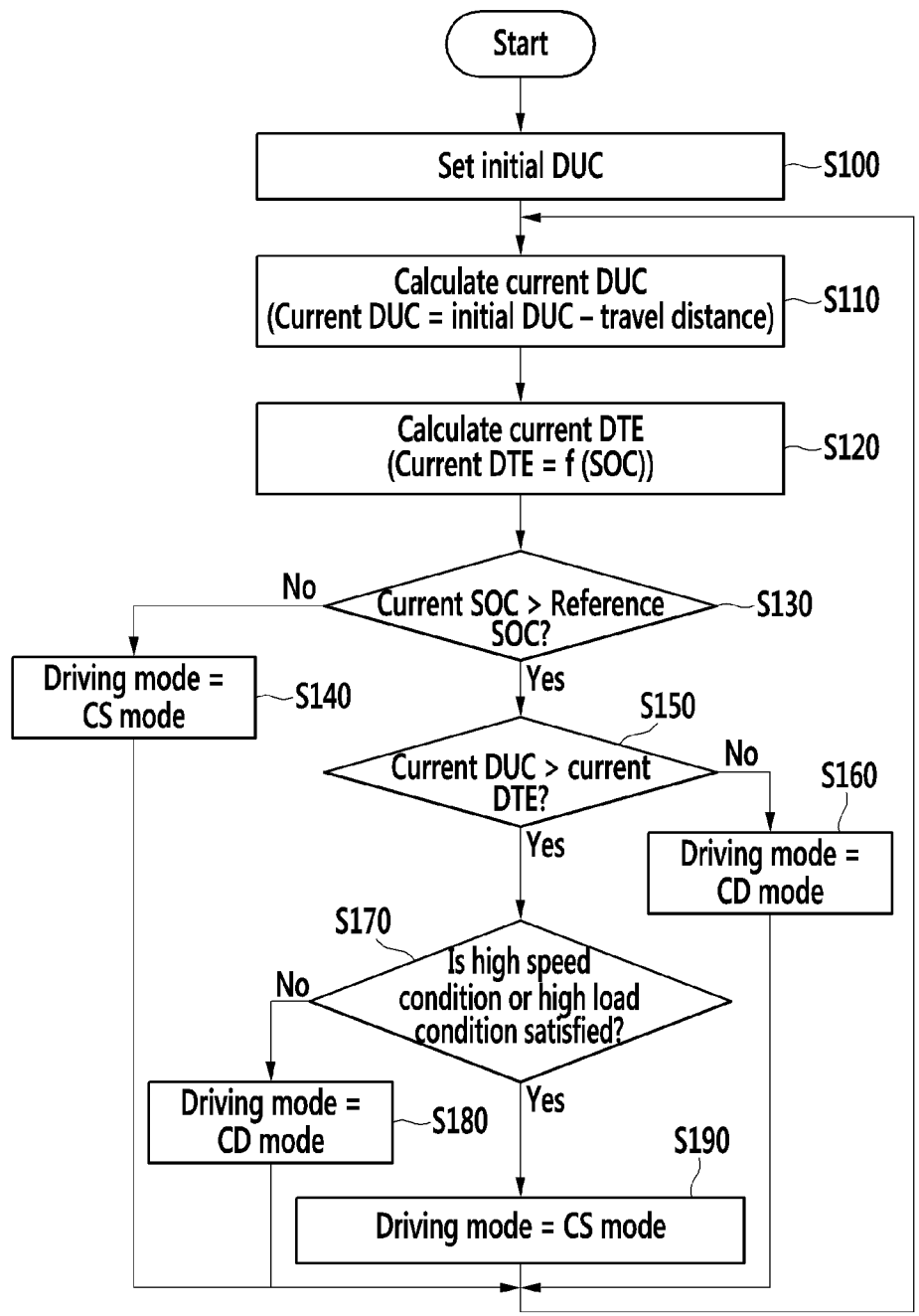
FIG. 3 is a flow chart of a method for operating a plug-in hybrid electric vehicle according to an exemplary embodiment of the present invention.
Figure 4:
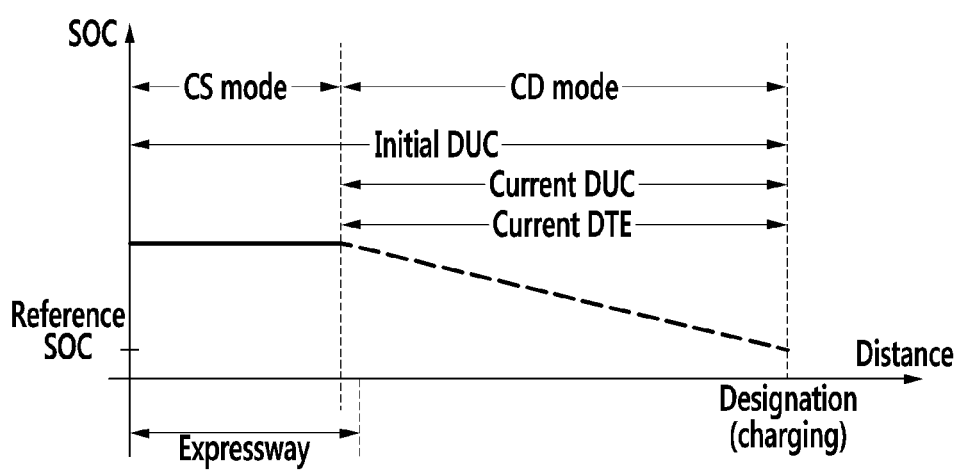
FIG. 4 is a graph illustrating the method for operating a plug-in hybrid electric vehicle according to an exemplary embodiment of the present invention.
Figure 5:
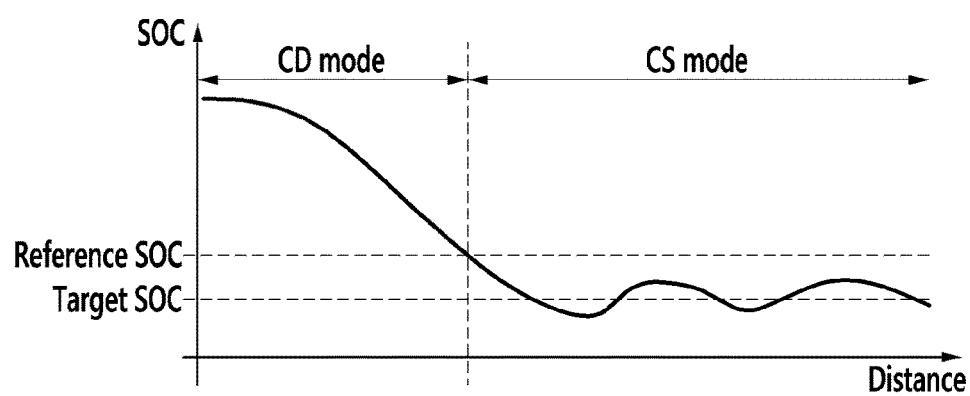
FIGS. 5, 6A, and 6B are graphs illustrating a driving mode of a conventional plug-in hybrid electric vehicle according to the related art.
Figure 6A:
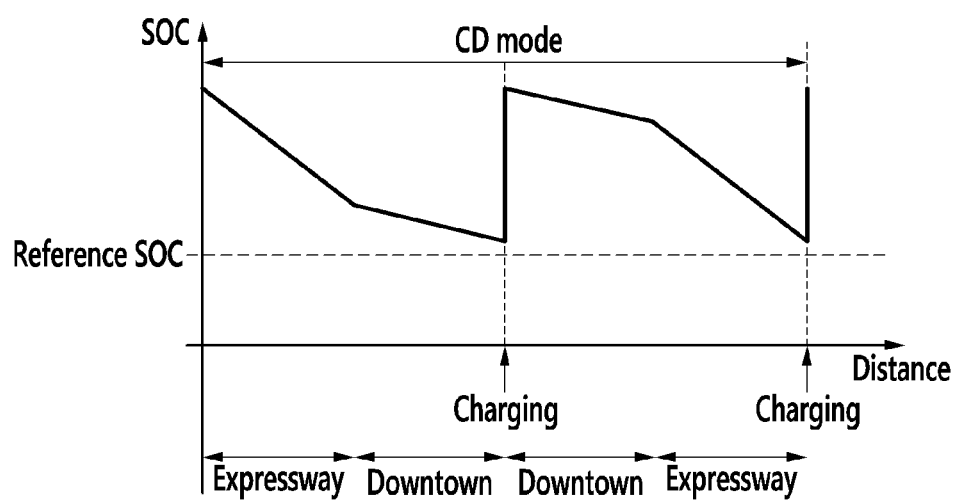
Figure 6B:
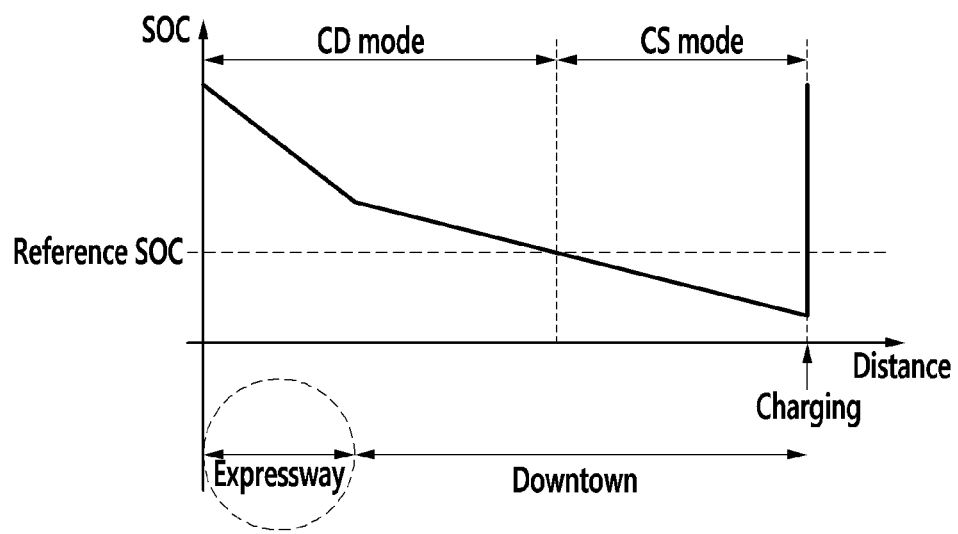

Hereinafter, the method for controlling a plug-in hybrid electric vehicle according to the exemplary embodiment of the present invention will be described in detail with reference to FIGS. 1 to 4. FIG. 3 is a flow chart of the method for operating a plug-in hybrid electric vehicle according to an exemplary embodiment of the present invention and FIG. 4 is a graph illustrating the method for operating a plug-in hybrid electric vehicle according to an exemplary embodiment of the present invention.

Referring to FIGS. 1 to 4, the method for operating a plug-in hybrid electric vehicle according to the exemplary embodiment of the present invention begins with setting an initial distance until charge (DUC) (S100). The DUC may be a remaining distance from the current position of the plug-in hybrid electric vehicle 100 to a charging station in which the battery 30 may be charged.

The controller 60 may be configured to set the initial DUC. For example, the controller 60 may be configured to determine whether the battery 30 is charged by the external power supply 200. When the battery 30 is charged by the external power supply 200, the controller 60 may be configured to display a message window requesting the input of the initial DUC through the user interface unit 50. When the user such as the driver inputs the initial DUC through the user interface unit 50, the user interface unit 50 may be configured to transmit information regarding the initial DUC to the controller 60. Therefore, the charging intention of the driver may be clearly determined.

Alternatively, when the driver inputs a destination through the user interface unit 50, the user interface unit 50 may be configured to transmit information regarding the destination to the controller 60. The controller 60 may, in response, be configured to set the distance from the current position of the plug-in hybrid electric vehicle 100 to the designation to be the initial DUC. Since the availability of battery charging at the destination may be unknown, the controller 60 may be configured to set the initial DUC using the destination when it does not receive the information regarding the initial DUC from the user interface unit 50.

The controller 60 may then be configured to calculate a current DUC by subtracting a travel distance of the plug-in hybrid electric vehicle from the initial DUC after the initial DUC is set (S110). The controller 60 may also be configured to update the DUC based on the traveling of the plug-in hybrid electric vehicle 100. Additionally, the controller 60 may be configured to calculate a current distance to empty (DTE) based on a current SOC of the battery 30 (S120). The DTE is a drivable distance (e.g., drivable distance until the SOC of the battery 30 reaches the reference SOC) using the electrical energy of the battery 30. The controller 60 may be configured to calculate the current DTE based on a function using the current SOC of the battery 30 as a variable. Alternatively, the controller 60 may be configured to calculate the current DTE using a map table in which the DTE that corresponds to the SOC of the battery 30 is stored.

Further, the controller 60 may be configured to compare the current SOC with the reference SOC (S130). The reference SOC may be set to be a value determined by those skilled in the art, in consideration of the energy efficiency of the engine 10 and the energy efficiency of the motor 20. In the step S130, when the current SOC is equal to or less than the reference SOC, the controller 60 may be configured to set the driving mode of the plug-in hybrid electric vehicle 100 to be the CS mode (S140). In particular, the controller 60 may be configured to compare the demand power of the driver with the first preset power P1 to determine whether to start the engine 10.

In the step S130, when the current SOC is greater than the reference SOC, the controller 60 may be configured to compare the current DUC with the current DTE (S150). In the step S150, when the current DUC is equal to or less than the current DTE, the controller 60 may be configured to set the driving mode of the plug-in hybrid electric vehicle 100 to be the CD mode (S160). Particularly, the controller 60 may be configured to compare the demand power of the driver with the second preset power P2 to determine whether to start the engine 10.

In the step S150, when the current DUC is greater than current DTE, the controller 60 may be configured to determine whether a high speed condition or a high load condition is satisfied (S170). The high speed condition or the high load condition may be determined based on a moving average value of the vehicle speed and a moving average value of the gradient of the road. In the step S170, the controller 60 may be configured to calculate the moving average value $MAV_k$ of the vehicle speed at a current timing (k timing) based on the latest n vehicle speeds $V_k$ to $V_{k-n+1}$ and n weight values $WV_1$ to $WV_n$. The moving average value $MAV_k$ of the vehicle speed may be calculated using the following Equation.

$$MAV_k = \sum_{i=1}^{n} (V_{k-n+i} \times WV_i)$$

wherein, $V_{k-n+i}$ may be a vehicle speed at timing k−n+1 and $WV_i$ may be an i-th weight value.

A sum of the n weight values $WV_1$ to $WV_n$ is 1 and an i-th weight value may be equal to or less than an (i+1)-th weight value (i.e., $WV_i \leq WV_{i+1}$). The (i+1)-th weight value may be set to be equal to or greater than the i-th weight value, and thus the latest vehicle speed has the greatest effect on the moving average value $MAV_k$ of the vehicle speed.

In the step S170, the controller 60 may be configured to calculate the moving average value $MAS_k$ of the gradient of the road at the current timing (k timing) based on the latest m gradients $S_k$ to $S_{k-m+1}$ of the road and m weight values $WS_1$ to $WS_m$. The moving average value $MAS_k$ of the gradient of the road may be calculated using the following Equation.

$$MAS_k = \sum_{i=1}^{m} (S_{k-m+i} \times WS_i)$$

wherein, $S_{k-m+i}$ may be a gradient of a road at timing k−m+1 and $WS_i$ may be an i-th weight value.

A sum of the m weight values $WS_1$ to $WS_m$ is 1 and an i-th weight value may be equal to or less than an (i+1)-th weight value (i.e., $WS_i \leq WS_{i+1}$). The (i+1)-th weight value may be set to be equal to or greater than the i-th weight value, and thus the latest gradient of the road has the greatest effect on the moving average value $MAS_k$ of the gradient of the road.

The controller 60 may be configured to determine whether the high speed condition or the high load condition is satisfied based on the moving average value $MAV_k$ of the vehicle speed and the moving average value $MAS_k$ of the gradient of the road. In other words, the controller 60 may be configured to determine whether the plug-in hybrid electric vehicle 100 is driving on an expressway or a uphill road which is not congested (e.g., no traffic). In the step S170, when the high speed condition or the high load condition is not satisfied, the controller 60 may be configured to set the driving mode of the plug-in hybrid electric vehicle 100 to be the CD mode (S180). In particular, the controller 60 may be configured to compare the demand power of the driver with the second preset power P2 to determine whether to start the engine 10.

In the step S170, when the high speed condition or the high load condition is satisfied, the controller 60 may be configured to set the driving mode of the plug-in hybrid electric vehicle 100 to be the CS mode (S190). In particular, the controller 60 may be configured to compare the demand power of the driver with the first preset power P1 to determine whether to start the engine 10. After the driving mode of the plug-in hybrid electric vehicle 100 is set, the controller 60 may return to the step S110 and each step of the method for operating a plug-in hybrid electric vehicle according to the exemplary embodiment of the present invention may be repeated.

Meanwhile, the method for operating a plug-in hybrid electric vehicle according to the exemplary embodiment of the present invention may end when the driving of the plug-in hybrid electric vehicle stops or the initial DUC is reset. As described above, according to an exemplary embodiment of the present invention, it may be possible to set the driving mode of plug-in hybrid electric vehicle 100 suitable for the current traveling condition. As a result, it may be possible to improve the energy efficiency of the plug-in hybrid electric vehicle 100.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a plug-in hybrid electric vehicle, comprising:
    setting, by a controller, an initial distance until charge (DUC);
    calculating, by the controller, a current DUC by subtracting a travel distance of the plug-in hybrid electric vehicle from the initial DUC after the initial DUC is set;
    calculating, by the controller, a current distance to empty (DTE) based on a current state of charge (SOC) of a battery;
    comparing, by the controller, the current SOC of the battery with a reference SOC;
    comparing, by the controller, the current DUC with the current DTE when the current SOC is greater than the reference SOC;
    determining, by the controller, whether a high speed condition or a high load condition is satisfied when the current DUC is greater than the current DTE; and
    setting, by the controller, a driving mode of the plug-in hybrid electric vehicle to be a charge sustaining (CS) mode when the high speed condition or the high load condition is satisfied.

2. The method of claim 1, wherein the setting of the initial DUC includes:
    determining, by the controller, whether the battery is charged by an external power supply;
    displaying, by the controller, a message window requesting an input of the initial DUC through a user interface unit when the battery is charged by the external power supply; and
    receiving, by the controller, information regarding the initial DUC from the user interface unit.

3. The method of claim 1, wherein the setting of the initial DUC includes:
    receiving, by the controller, information regarding a designation through the user interface unit; and
    setting, by the controller, a distance from a current position of the plug-in hybrid electric vehicle to a destination to be the initial DUC.

4. The method of claim 1, further comprising:
    setting, by the controller, the driving mode of the plug-in hybrid electric vehicle to be a CS mode when the current SOC of the battery is less than or equal to the reference SOC.

5. The method of claim 1, further comprising:
    setting, by the controller, the driving mode of the plug-in hybrid electric vehicle to be a charge depleting (CD) mode when the current DUC is less than or equal to the current DTE.

6. The method of claim 1, further comprising:
    setting, by the controller, a driving mode of the plug-in hybrid electric vehicle to be a charge depleting (CD) mode when the high speed condition or the high load condition is not satisfied.

7. The method of claim 1, wherein whether the high speed condition or the high load condition is satisfied is determined based on a moving average value of a vehicle speed and a moving average value of a gradient of a road.

8. The method of claim 7, wherein the moving average value $MAV_k$ of the vehicle speed is calculated using the following equation:

$$MAV_k = \sum_{i=1}^{n}(V_{k-n+i} \times WV_i),$$

wherein, $V_{k-n+i}$ is a vehicle speed at timing k−n+1 and $WV_i$ is a i-th weight value.

9. The method of claim 8, wherein the n weight values satisfy relation of $WV_i \leq WV_{i+1}$.

10. The method of claim 7, wherein the moving average value $MAS_k$ of the gradient of the road is calculated using the following equation:

$$MAS_k = \sum_{i=1}^{m}(S_{k-m+i} \times WS_i),$$

wherein, $S_{k-m+i}$ is a gradient of a road at timing k−m+1 and $WS_i$ is an i-th weight value.

11. The method of claim 10, wherein the m weight values satisfy relation of $WS_i \leq WS_{i+1}$.

12. The method of claim 1, further comprising:
    comparing, by the controller, demand power of a driver with a first predetermined power when the driving mode of the plug-in hybrid electric vehicle is set to be the CS mode; and
    starting, by the controller, an engine when the demand power of the driver is greater than the first predetermined power.

13. The method of claim 12, further comprising:
    comparing, by the controller, the demand power of the driver with a second predetermined power when the driving mode of the plug-in hybrid electric vehicle is set to be a charge deleting (CD) mode; and
    starting, by the controller, the engine when the demand power of the driver is greater than the second predetermined power,
    wherein the first predetermined power is less than the second predetermined power.

14. An apparatus for controlling a plug-in hybrid electric vehicle, comprising:
    a data detector configured to detect data for operating the plug-in hybrid electric vehicle;
    a user interface unit configured to provide an interface to receive user input; and
    a controller configured to be executed by a predetermined program to operate the plug-in hybrid electric vehicle based on signals input from the data detector and the user interface unit, wherein the predetermined program includes a series of commands for performing a method for operating the plug-in hybrid electric vehicle, the method comprising:
    setting, by the controller, an initial distance until charge (DUC);

calculating, by the controller, a current DUC by subtracting a travel distance of the plug-in hybrid electric vehicle from the initial DUC after the initial DUC is set;

calculating, by the controller, a current distance to empty (DTE) based on a current state of charge (SOC) of a battery;

comparing, by the controller, the current SOC of the battery with a reference SOC;

comparing, by the controller, the current DUC with the current DTE when the current SOC is greater than the reference SOC;

determining, by the controller, whether a high speed condition or a high load condition is satisfied when the current DUC is greater than the current DTE; and setting, by the controller, a driving mode of the plug-in hybrid electric vehicle to be a charge sustaining (CS) mode when the high speed condition or the high load condition is satisfied.

15. The apparatus of claim 14, wherein in the setting of the initial DUC the controller is further configured to:
   determine whether the battery is charged by an external power supply;
   display a message window requesting an input of the initial DUC through a user interface unit when the battery is charged by the external power supply; and
   receive information regarding the initial DUC from the user interface unit.

16. The apparatus of claim 14, wherein the controller is further configured to set the driving mode of the plug-in hybrid electric vehicle to be a CS mode when the current SOC of the battery is less than or equal to the reference SOC.

17. The apparatus of claim 14, wherein the controller is further configured to set the driving mode of the plug-in hybrid electric vehicle to be a charge depleting (CD) mode when the current DUC is less than or equal to the current DTE.

18. A non-transitory computer readable medium containing program instructions executed by a controller, the computer readable medium comprising:
   program instructions that set an initial distance until charge (DUC);
   program instructions that calculate a current DUC by subtracting a travel distance of a plug-in hybrid electric vehicle from the initial DUC after the initial DUC is set;
   program instructions that calculate a current distance to empty (DTE) based on a current state of charge (SOC) of a battery;
   program instructions that compare the current SOC of the battery with a reference SOC;
   program instructions that compare the current DUC with the current DTE when the current SOC is greater than the reference SOC;
   program instructions that determine whether a high speed condition or a high load condition is satisfied when the current DUC is greater than the current DTE; and
   program instructions that set a driving mode of the plug-in hybrid electric vehicle to be a charge sustaining (CS) mode when the high speed condition or the high load condition is satisfied.

19. The non-transitory computer readable medium of claim 18, further comprising program instructions that set the driving mode of the plug-in hybrid electric vehicle to be a CS mode when the current SOC of the battery is less than or equal to the reference SOC.

20. The non-transitory computer readable medium of claim 18, further comprising program instructions that set the driving mode of the plug-in hybrid electric vehicle to be a charge depleting (CD) mode when the current DUC is less than or equal to the current DTE.

* * * * *